(12) United States Patent
Bush

(10) Patent No.: US 10,534,200 B2
(45) Date of Patent: *Jan. 14, 2020

(54) EYEGLASSES WITH MOVABLE LENSES

(71) Applicant: William Bush, Vienna, VA (US)

(72) Inventor: William Bush, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,689

(22) Filed: Mar. 28, 2017

(65) Prior Publication Data

US 2017/0199398 A1 Jul. 13, 2017

Related U.S. Application Data

(63) Continuation of application No. 14/213,978, filed on Mar. 14, 2014, now Pat. No. 9,606,374.

(60) Provisional application No. 61/802,282, filed on Mar. 15, 2013.

(51) Int. Cl.
*G02C 9/02* (2006.01)
*G02C 5/00* (2006.01)
*G02C 5/14* (2006.01)

(52) U.S. Cl.
CPC .............. *G02C 9/02* (2013.01); *G02C 5/005* (2013.01); *G02C 5/146* (2013.01)

(58) Field of Classification Search
CPC ....................................................... G02C 9/02
See application file for complete search history.

(56) References Cited

U.S. PATENT DOCUMENTS 6,485,143 B2 * 11/2002 Buettgenbach ........ G02B 7/002
351/158
6,764,176 B1 * 7/2004 Carlson .................. G02B 7/002
351/116

* cited by examiner

*Primary Examiner* — Charlie Y Peng

(57) ABSTRACT

Eyeglasses, including a frame for supporting the eyeglasses on a user's face, a platform movably connected to the frame, and a plurality of lenses moveable relative to the frame along with the platform, each of the lenses being movably connected to the platform.

13 Claims, 9 Drawing Sheets

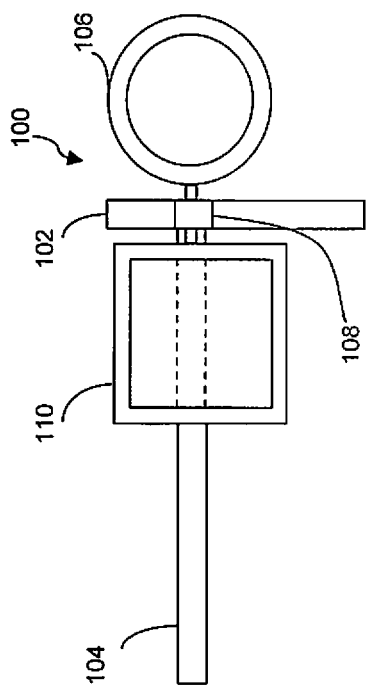
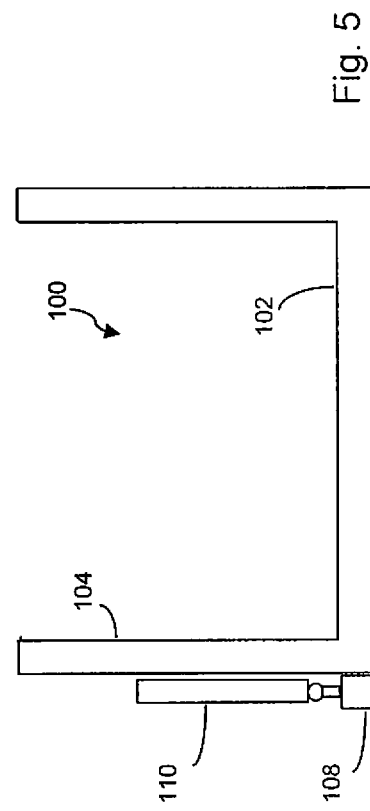
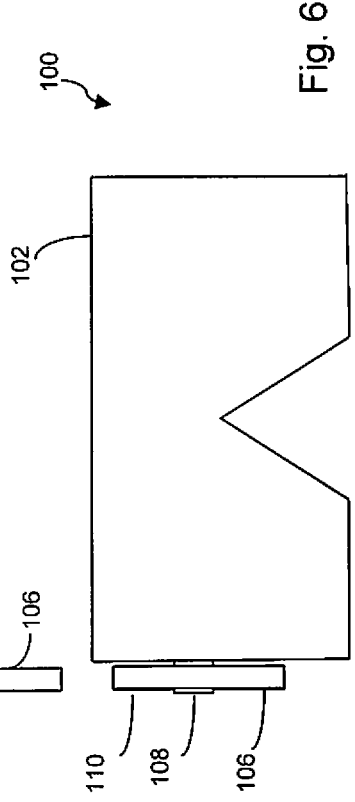

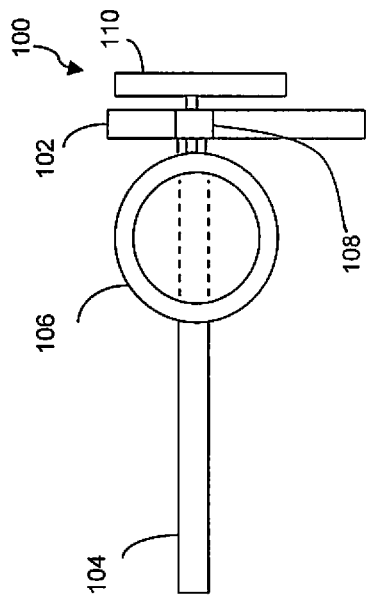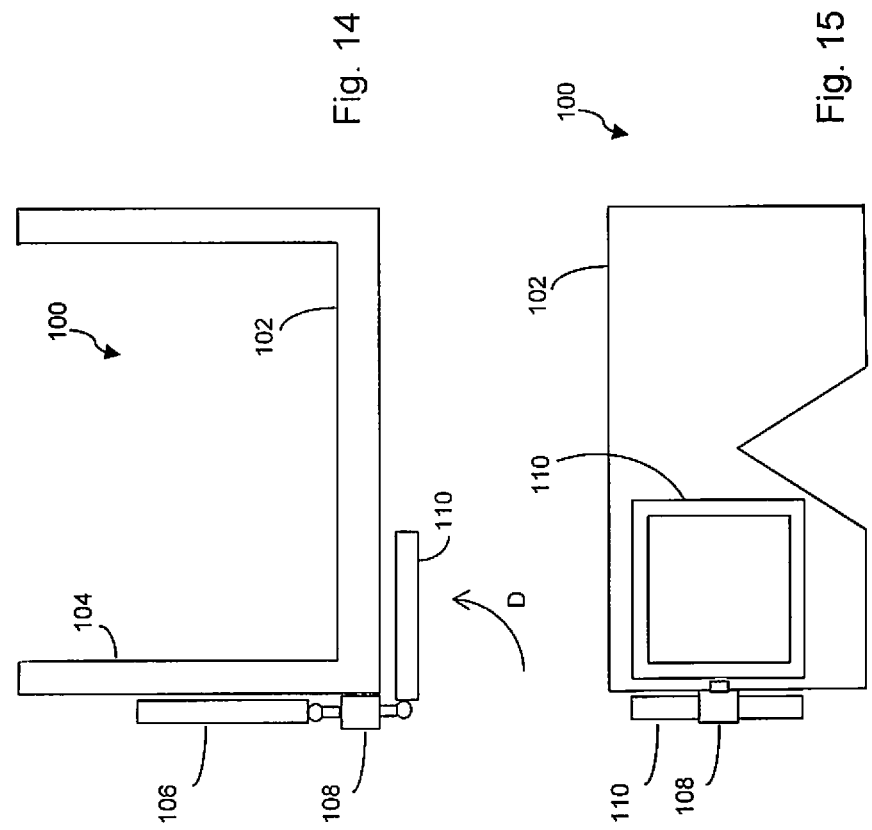

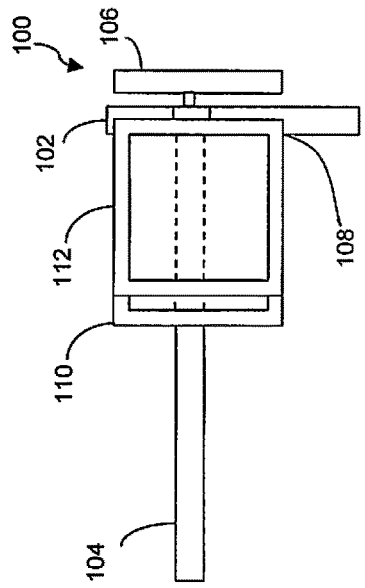
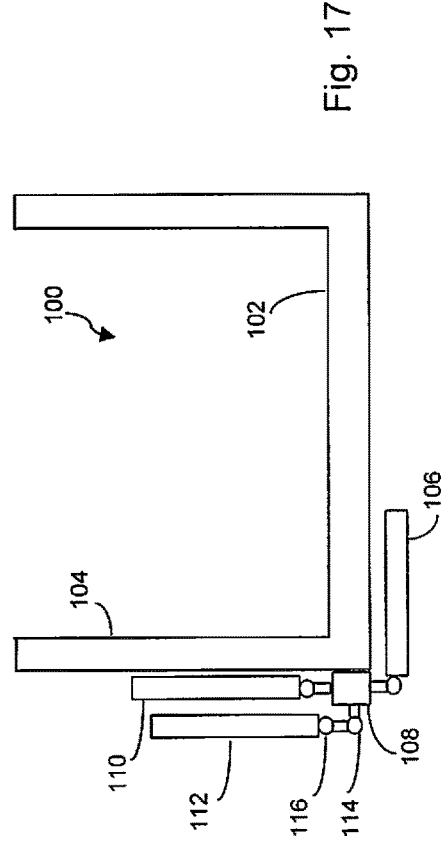
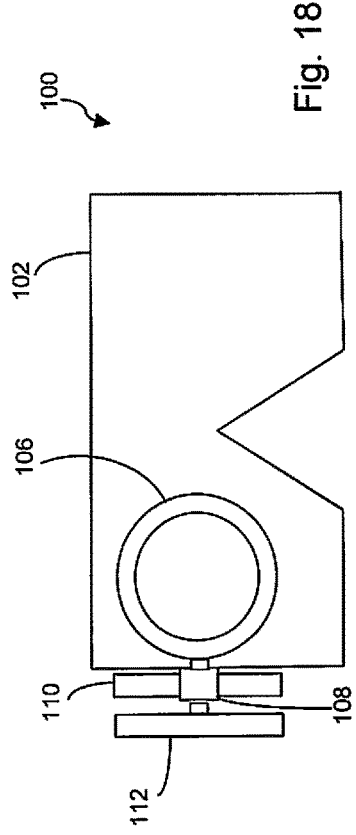

EYEGLASSES WITH MOVABLE LENSES

CROSS-REFERENCE TO RELATED APPLICATION

This application is a continuation of U.S. patent application Ser. No. 14/213,978, filed Mar. 14, 2014, which claims priority under 35 USC § 119(e) from U.S. Provisional Patent Application Ser. No. 61/802,282 filed on Mar. 15, 2013. Each of the disclosures of these applications is hereby incorporated herein by reference in its entirety.

BACKGROUND OF THE INVENTION

1. Field of the Invention

The present invention relates to eyeglasses, and more particularly, to eyeglasses with movable lenses.

2. Description of the Related Art

As a person ages, eyesight often deteriorates. Eyeglasses can be used to correct for the deterioration. But more than one prescription can be required to correct for different problems. For example, a person may need correction for distance vision as well as needing correction for close-up work, such as reading. Bifocals are a common solution to such a problem. But many people get dizzy and/or sick using bifocals. Further, when working on a computer, bifocal users often have to hold their heads at odd or uncomfortable angles. And although some people adjust and are able to use bifocals without issue, some people do not adjust, or do not want to adjust.

For such people, one solution is to have multiple pairs of glasses, for example, a pair of reading glasses and a pair of distance-vision glasses. But carrying more than one pair of glasses can be cumbersome, and glasses can be misplaced if not worn. The problem is exacerbated if sunglasses are also used. Accordingly, improvements are needed.

SUMMARY OF EMBODIMENTS OF THE INVENTION

Accordingly, it is an aspect of the present invention to provide wearable eyeglasses with more than one pair of separate viewing lenses.

The foregoing and/or other aspects of the present invention are achieved by providing eyeglasses, including a frame for supporting the eyeglasses on a user's face, a platform movably connected to the frame, and a plurality of lenses moveable relative to the frame along with the platform, each of the lenses being movably connected to the platform.

The foregoing and/or other aspects of the present invention are achieved by providing a method of changing lenses to see through on eyeglasses, including moving a first lens out of a viewing position on a frame of the eyeglasses, and moving a platform relative to the frame, thereby positioning a second lens to be moved into the viewing position. The first and second lenses are movably connected to the platform, and the platform is movably connected to the frame. The method also includes moving the second lens into the viewing position.

Additional and/or other aspects and advantages of the present invention will be set forth in the description that follows, or will be apparent from the description, or may be learned by practice of the invention.

BRIEF DESCRIPTION OF THE DRAWINGS

The above and/or other aspects and advantages of embodiments of the invention will be more readily appreciated from the following detailed description, taken in conjunction with the accompanying drawings, of which:

FIGS. 5-7 are respective top, front, and right side views of the eyeglasses of FIG. 1, with the first lens in an open position;

FIGS. 14-16 are respective top, front, and right side views of the eyeglasses of FIG. 1, with the second lens in the viewing position;

FIGS. 17-19 are respective top, front, and right side views of eyeglasses in accordance with another embodiment of the present invention, with a first lens in a viewing position and second and third lenses in respective storage positions;

DETAILED DESCRIPTION OF EMBODIMENTS OF THE PRESENT INVENTION

Figure 1:
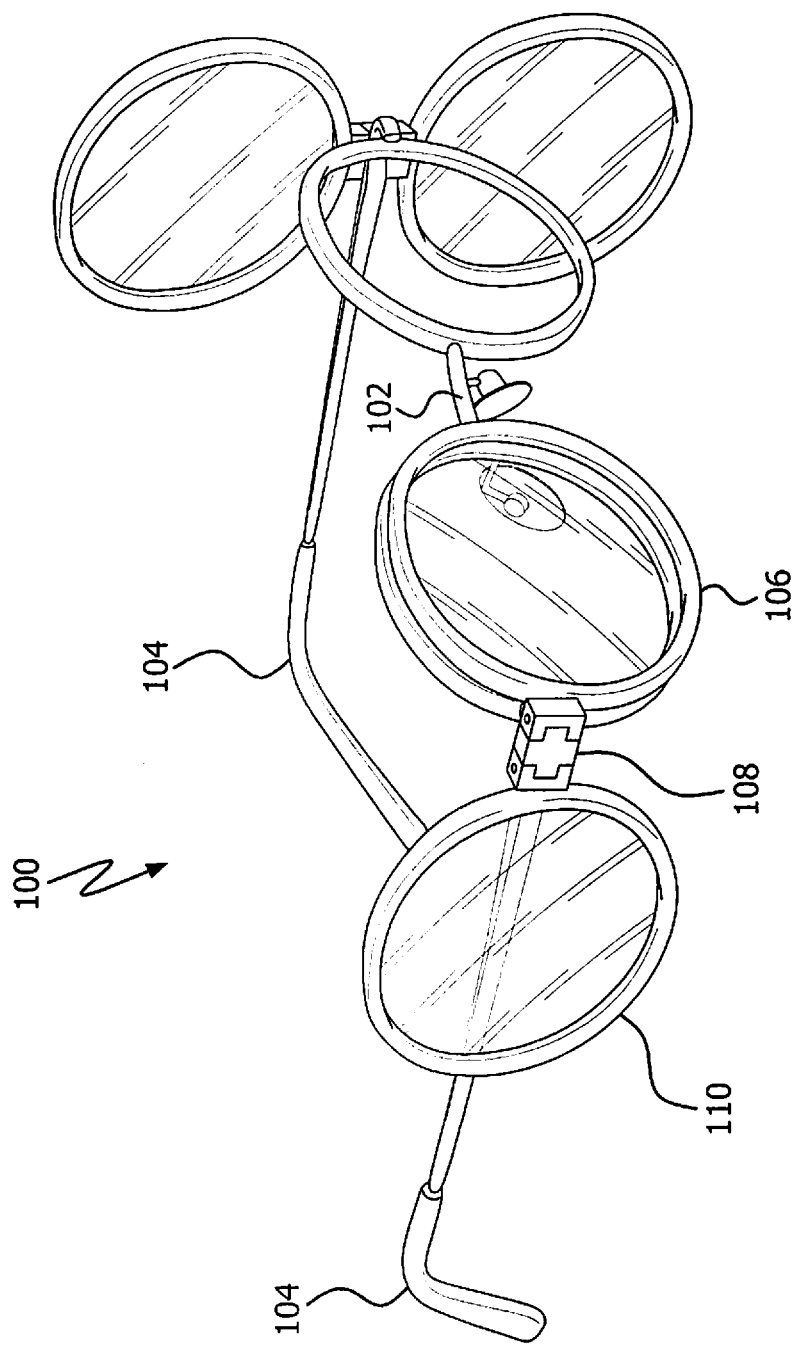
FIG. 1 is a perspective view of eyeglasses in accordance with an embodiment of the present invention.

Reference will now be made in detail to embodiments of the present invention, which are illustrated in the accompanying drawings, wherein like reference numerals refer to like elements throughout. The embodiments described herein exemplify, but do not limit, the present invention by referring to the drawings. As will be understood by one skilled in the art, terms such as up, down, upper, lower, bottom, and top are relative, and are employed to aid illustration, but are not limiting.

FIG. 1 is a perspective view of eyeglasses 100 in accordance with an embodiment of the present invention. As shown in FIG. 1, the glasses 100 include a frame 102, a pair of ear extension supports 104, a first lens 106, a platform 108 that is movably connected to the frame 102, and a second lens 110. The first and second lenses 106 and 110 are movably connected to the platform 108. For illustrative purposes, the first and second lenses 106 and 110 are shown as having secondary frames around the respective lenses. One skilled in the art will appreciate that embodiments that do not employ such secondary frames are also within the scope of the present invention. For clarity, however, the lenses will simply be referred to as, for example, the first and second lenses 106 and 110.

More specifically, according to one embodiment, the platform 108 is rotatably connected to the frame 102. For example, a pin can be connected to the frame 102, and the platform 108 can be rotatably secured to the pin so that the platform 108 can rotate about the pin relative to the frame 102. In other words, the platform 108 rotates about a first or platform axis relative to the frame 102. According to one embodiment, the first axis is substantially perpendicular to a side of the frame 102. According to another embodiment, the platform axis is substantially perpendicular to the extension support 104 (when the extension support is in an extended position). In other words, the platform axis is substantially parallel to a face of the frame (if the frame is substantially planar). One skilled in the art will appreciate that the angles of axes relative to other portions of the eyeglasses 100 can vary without departing from the present invention's scope. One skilled in the art will also appreciate that other mechanisms can be employed to movably connect the platform 108 and the frame 102 without departing from the present invention's scope.

The first and second lenses 106 and 110 are movably connected to the platform 108. Because the lenses 106 and 110 are connected to the platform 108, as the platform 108 moves (for example, rotates) relative to the frame 102, the first and second lenses 106 and 110 also move relative to the frame 102 along with the platform 108. The combination of the platform 108 and the first and second lenses 106 and 116 forms a lens set. Preferably, a lens set is movably connected to the frame 102 for each eye, as shown in FIG. 1.

Preferably, the first and second lenses 106 and 110 are rotatably connected to the platform 108. In more detail, according to one embodiment, the first lens 106 is rotatably connected to the platform 108. Put another way, the first lens 106 rotates about a first lens axis with respect to the platform 108. Similarly, the second lens 110 is rotatably connected to the platform 108. Stated differently, the second lens 110 rotates about a second lens axis with respect to the platform 108. According to one embodiment, the first lens axis and the second lens axis are not co-linear. Although according to one embodiment, the first lens axis and the second lens axis are substantially parallel. According to one embodiment, each of the first and second lenses 106 and 110 are movable relative to the platform 108 independent of each other.

As illustrated in FIGS. 2-16, this configuration permits a user to have two lenses connected to the same frame for each eye, and permits the user to select which lenses to use without having to change glasses. And because the lenses are all connected to the same frame, the user is less likely to misplace one of the lenses. Although it is preferable to have a lens set for each eye, for illustrative purposes, only one lens set is shown in FIGS. 2-16.

Figure 4:
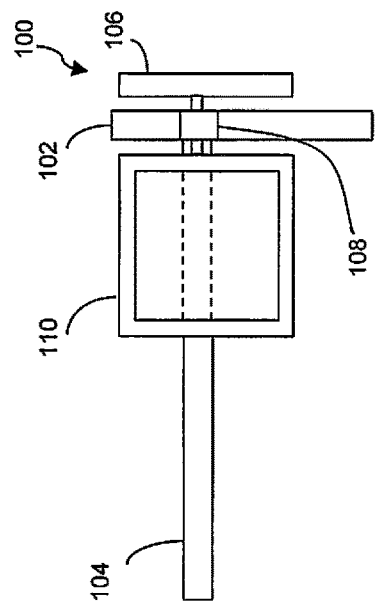
FIGS. 2-4 are respective top, front, and right side views of the eyeglasses of FIG. 1, with a first lens in a viewing position and a second lens in a storage position.
Figure 2:
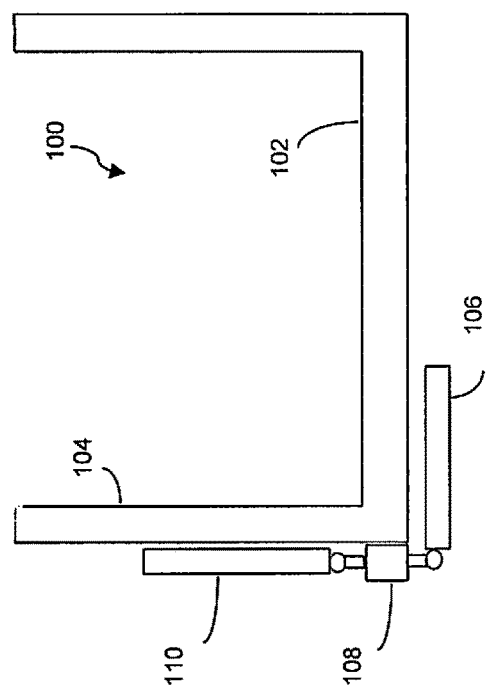
Figure 3:
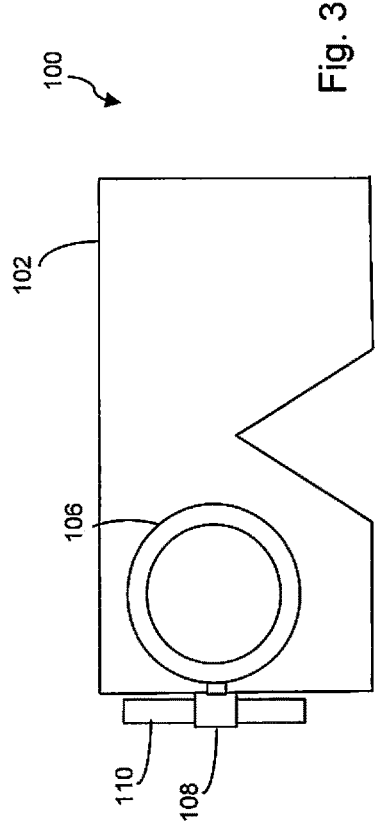

FIG. 2 is a top view, FIG. 3 is a front view, and FIG. 4 is a side view of eyeglasses 100 in accordance with an embodiment of the present invention. Similarly, FIGS. 5, 8, 11, and 14 are top views, FIGS. 6, 9, 12, and 15 are front views, and FIGS. 6, 10, 13, and 16 are side views of the glasses 100 during different phases of the transition from the first lens 106 to the second lens.

In FIGS. 2-4, the first lens 106 is in a viewing position. When a lens is in the viewing position, a user employing the glasses 100 can see through the lens normally. In other words, in the viewing position, the lens is disposed adjacent to the front of the frame 102 in front of the user's eye so that the user can see through the lens as they would through a conventional pair of glasses. For illustrative purposes, the frame 102 depicted in FIGS. 2-16 has a different shape than the frame 102 shown in FIG. 1. One skilled in the art will understand that the frame 102 can have different shapes without departing from the present invention's scope.

To change from the first lens 106 to the second lens 110, the user first rotates the first lens 106 away from the viewing position to an open position, as shown in FIGS. 5-7, for example, direction A shown in FIG. 5. According to one embodiment, the mechanism enabling rotation about the first lens axis has stops so that the first lens 106 selectively maintains its position relative to the platform 108 when the first lens 106 is disposed in the viewing position and when the first lens 106 is disposed in the open position. For example, if an axle is used to enable the rotation, the axle could be generally smooth, but have flats at positions corresponding to the first lens being disposed in the viewing position and/or the open position. The axle can generally bear against a surface that will prevent unintended rotation from the viewing or open positions. Such positioning can be selectively overcome by the user. One skilled in the art will appreciate that other methods or mechanisms can be employed without departing from the present invention's scope. A similar mechanism can be employed to provide stopped rotation of the second lens 110 about the second lens axis. Such stopped rotation can aid in positioning the lenses 106 and 110, and can prevent the lenses 106 and 110 from pivoting freely about their respective axes of rotation.

In addition to, or as an alternative to the stopped rotation, the first and second lenses can have a positioning and/or securing unit. According to one embodiment, either the frame 102 or the lenses 106 and 110 have a lug, and the other of the frame 102 and the lenses 106 and 110 has a receiving slot or hole to receive the lug. For example, the frame 102 can have a lug and the first and second lenses 106 and 110 can each have a receiving slot or hole. When positioning the lens in the viewing position, the lug engages the receiving slot to properly position the selected lens relative to the frame 102, and also to help prevent the lens from unintentionally moving out of the viewing position. Such a system can also be employed to secure the unselected lens to the ear extension support 104.

Alternatively, both the lenses 106 and 110 and the frame 102 can have corresponding magnets disposed therein to properly position the selected lens relative to the frame 102, and also to help prevent the lens from unintentionally moving out of the viewing position. Such a system can also be employed to secure the unselected lens to the ear extension support 104. One skilled in the art will appreciate that other methods or mechanisms can be employed without departing from the scope of the present invention.

Figure 10:
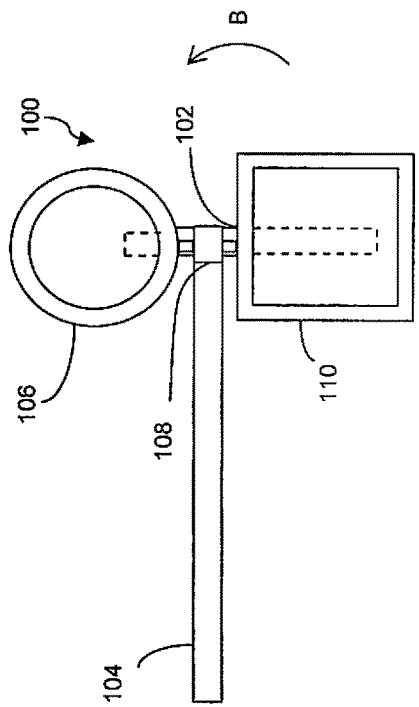
FIGS. 8-10 are respective top, front, and right side views of the eyeglasses of FIG. 1, with the first lens in an intermediate position.
Figure 8:
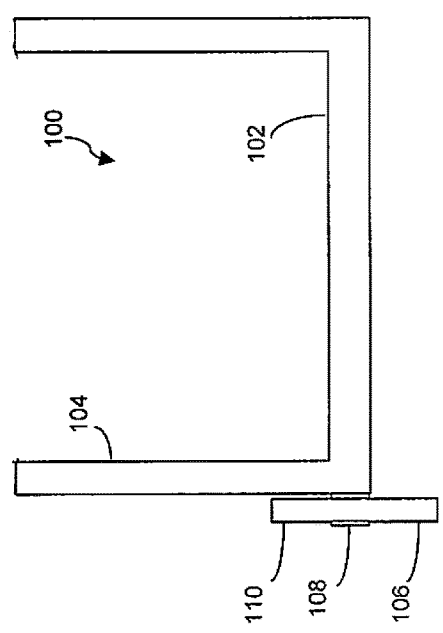
Figure 9:
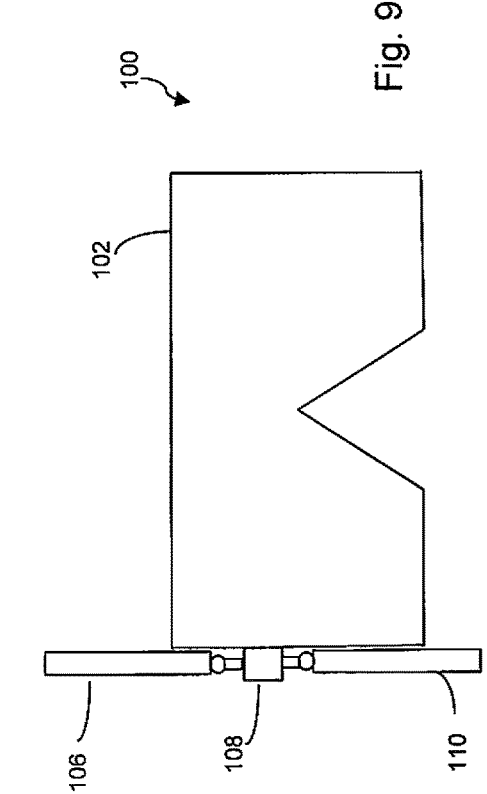

Subsequent to moving the first lens 106 to the open position, the user begins to rotate the lens set relative to the frame 102, as shown in FIGS. 8-10, for example, direction B in FIG. 10. The user can use one of the lenses 106 and 110 to rotate the lens set, or can use the platform 108 to rotate the lens set. According to one embodiment, the rotatable connection between the platform 108 and the frame 102 can have stops similar to those describe with respect to the first and second lens axes. Preferably, the platform 108 has stopped positions corresponding to when each of the lenses 106 and 110 are in the open position ready to be moved into the viewing position. Other stopped positions for the platform 108 are also possible without departing from the scope of the present invention.

Figure 13:
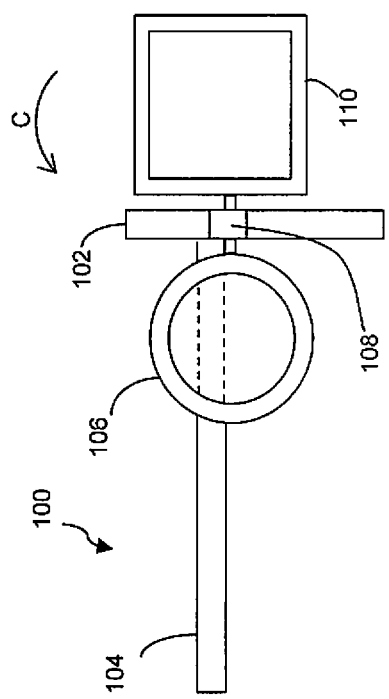
FIGS. 11-13 are respective top, front, and right side views of the eyeglasses of FIG. 1, with the second lens in the open position and the first lens in the storage position.
Figure 11:
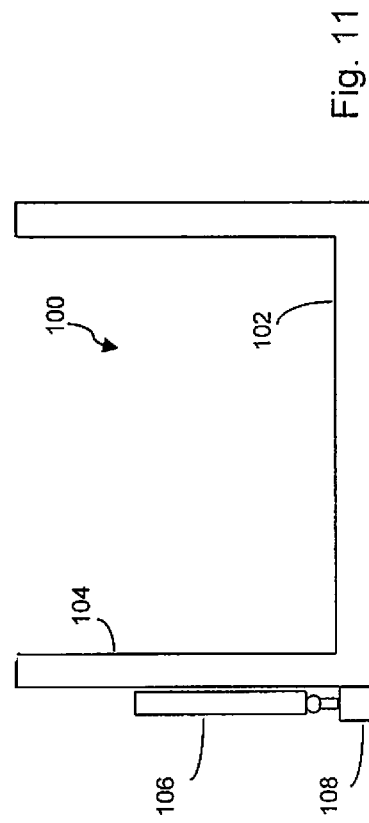
Figure 12:
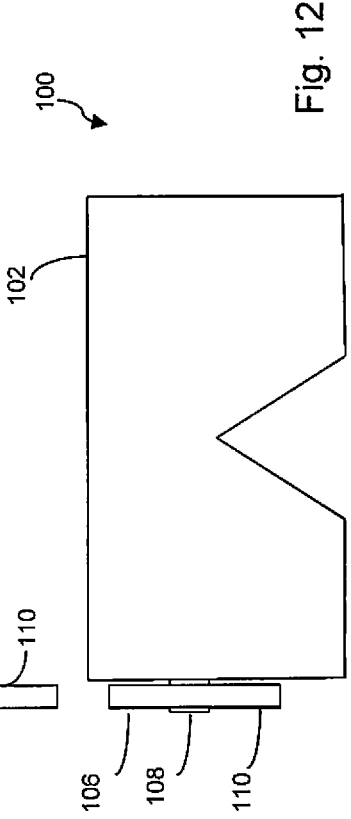
Figure 22:
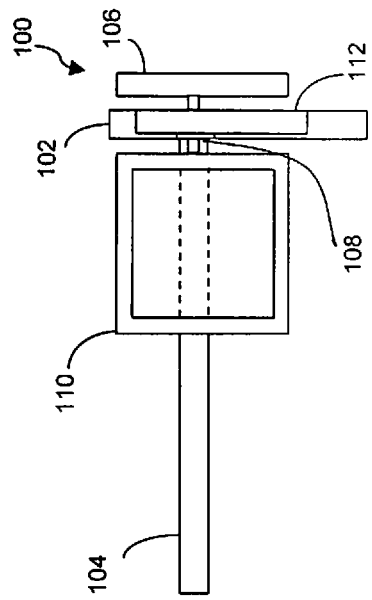
FIGS. 20-22 are respective top, front, and right side views of the eyeglasses of FIG. 17, with the first lens in a viewing position, a second lens in the storage position, and the third lens in an intermediate position.
Figure 20:
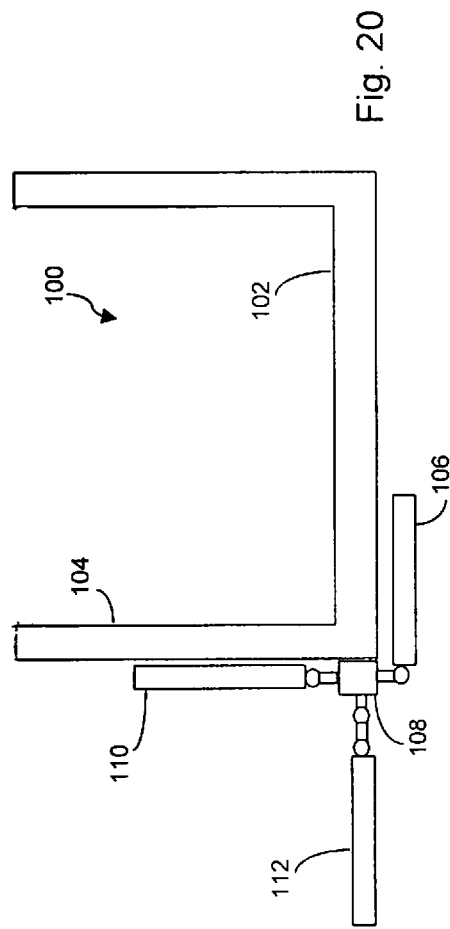
Figure 21:
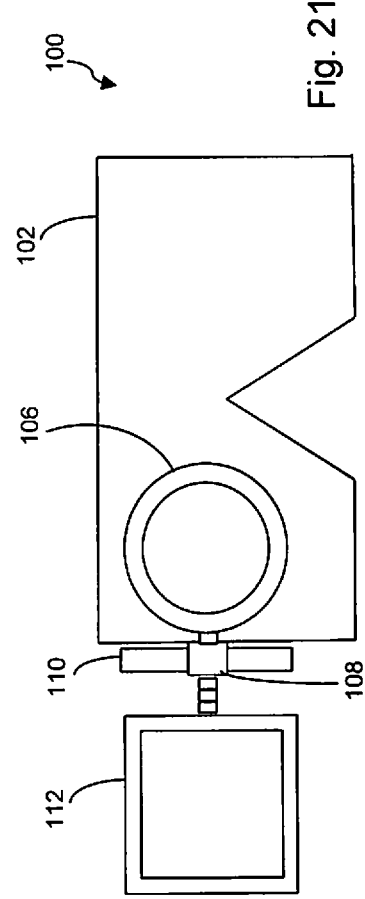
Figure 25:
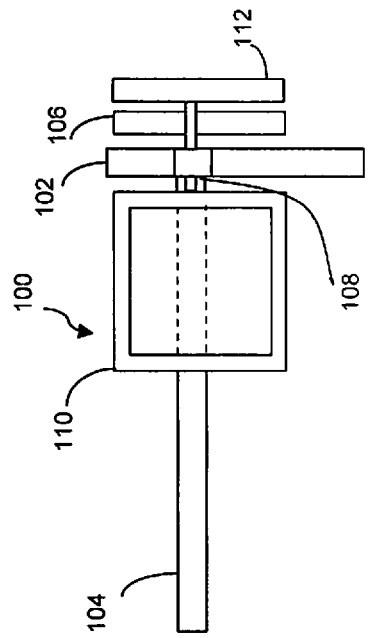
FIGS. 23-25 are respective top, front, and right side views of the eyeglasses of FIG. 17, with the first and third lenses in respective viewing positions.
Figure 23:
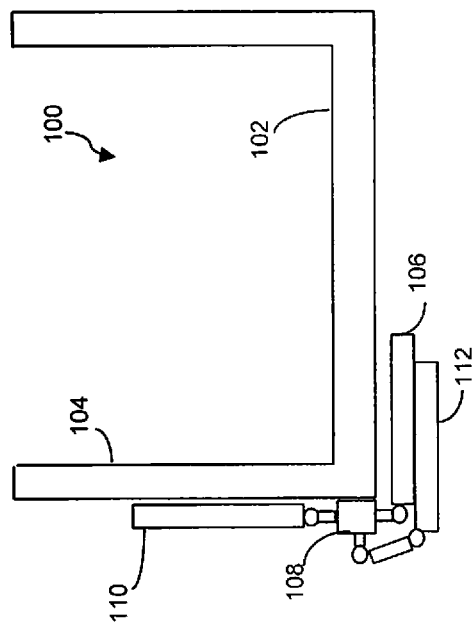
Figure 24:
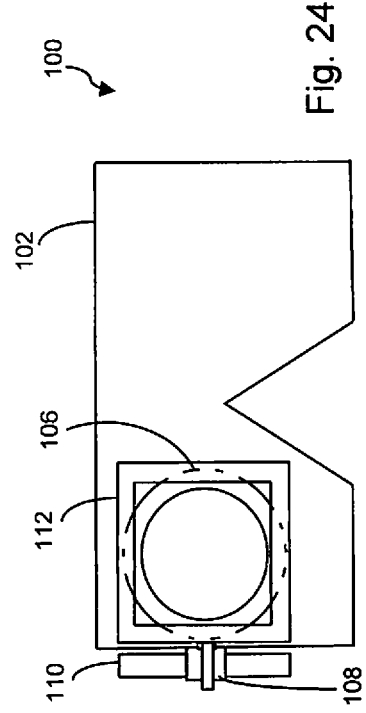

As shown in FIGS. 11-13, the user continues to move the lens set relative to the frame (for example, in direction C shown in FIG. 13) until the second lens 110 is positioned in the open position. Subsequently, as shown in FIGS. 14-16, the user rotates the second lens 110 about the second lens axis into the viewing position (for example, direction D shown in FIG. 14).

To change from second lens 110 back to the first lens 106, the user reverses the process. According to one embodiment, the platform 108 can rotate in either direction relative to the frame 102.

FIGS. 17-25 illustrate another embodiment of the present invention, in which a third lens 112 is rotatably connected to the platform 108. The third lens can be, for example, a darkened sunglass lens. With the arrangement described and illustrated in FIGS. 17-25, the user can position the third lens to overlap either the first lens 106 or the second lens 110, whichever lens is in the viewing position. According to one embodiment, the third lens 112 can also overlap the unselected lens and be secured thereto (for example, by magnets) so that when the user does not desire to look through the third lens 112, it can be secured out of the way.

Preferably, the third lens 112 is rotatably connected to the platform 108. More preferably, the third lens has two axes of rotation 114 and 116 (best shown in FIGS. 17, 20, and 23), so that the third lens can rotate about the primary axis 114 relative to the platform 108, and also rotate about the secondary axis 116 relative to the primary axis, as shown in FIGS. 17-25.

Although only a few embodiments of the present invention have been shown and described, the present invention is not limited to the described embodiments. Instead, it will be appreciated by those skilled in the art that changes may be made to these embodiments without departing from the principles and spirit of the invention. It is particularly noted that those skilled in the art can readily combine the various technical aspects of the various elements of the various exemplary embodiments that have been described above in numerous other ways, all of which are considered to be within the scope of the invention, which is defined by the appended claims and their equivalents.

What is claimed is:

1. Eyeglasses, comprising:
   a frame for supporting the eyeglasses on a user's face, the frame having a frontal frame;
   a platform movably connected to the frame to rotate about a first axis substantially parallel to a line connecting lateral ends of the frontal frame; and
   a plurality of lenses moveable relative to the frame along with the platform, each of the lenses being movably connected to the platform to rotate about its own second axis, each of the second axes being substantially perpendicular to the first axis.

2. The eyeglasses according to claim 1, wherein the platform is movable from:
   a first platform position in which one lens of the plurality is disposed within a selection region, in which the one lens is movable relative to the platform between an open position and a viewing position in front of and adjacent to the frontal frame, enabling a user to see through the one lens,
   to a second platform position, thereby removing the one lens of the plurality from the selection region and positioning another lens of the plurality within the selection region.

3. The eyeglasses according to claim 2, further comprising a securing unit selectively securing a lens in the viewing position.

4. The eyeglasses according to claim 1, further comprising a plurality of platforms, wherein each platform includes a plurality of lenses moveably connected thereto.

5. The eyeglasses according to claim 1, wherein each of the lenses has a different optical characteristic.

6. The eyeglasses according to claim 1, wherein the first and second lens axes are substantially perpendicular to the platform axis.

7. Eyeglasses, comprising:
   a frame for supporting the eyeglasses on a user's face, the frame having a frontal frame for positioning in front of a user's eyes;
   a platform movably connected to the frame; and
   a plurality of lenses moveable relative to the frame along with the platform, each of the lenses being connected to the platform and rotatable relative to the platform about its own lens axis;
   wherein the platform is rotatable about a platform axis substantially parallel to a line connecting lateral ends of the frontal frame.

8. The eyeglasses according to claim 7, wherein at least one of the lens axes is substantially perpendicular to the platform axis.

9. The eyeglasses according to claim 7, wherein the plurality of lenses comprises three lenses, one of which is movable to overlay either of the remaining lenses.

10. The eyeglasses according to claim 7, wherein the first and second lens axes are substantially perpendicular to the platform axis.

11. A method of changing lenses to see through on eyeglasses, comprising:
    rotating a platform relative to a frame having a frontal frame about a platform axis substantially parallel to a line connecting lateral ends of the frontal frame thereby moving first and second lenses movably disposed on the platform, wherein the first and second lenses are rotatable about respective first and second lens axes relative to the platform; and
    rotating the second lens about the second lens axis to a viewing position in front of and adjacent to the frame that enables a user to see through the second lens;
    wherein the first and second lens axes are substantially perpendicular to the platform axis.

12. The method according to claim 11, further comprising moving a third lens relative to the platform, to overlay at least one of the first and second lenses when that one of the first and second lenses is in the viewing position, thereby enabling a user to simultaneously see through both the third lens and the one of the first and second lenses in the viewing position.

13. The method according to claim 11, further comprising moving a third lens relative to the first and second lenses, the frame, and the platform, to overlay one of the first and second lenses.

\* \* \* \* \*